United States Patent
Paramasivam et al.

(10) Patent No.: US 9,406,984 B2
(45) Date of Patent: Aug. 2, 2016

(54) AIR-COOLED BATTERY MODULE FOR A VEHICLE

(71) Applicant: FORD GLOBAL TECHNOLOGIES, LLC, Dearborn, MI (US)

(72) Inventors: Saravanan Paramasivam, South Lyon, MI (US); LeeAnn Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/015,253

(22) Filed: Feb. 4, 2016

(65) Prior Publication Data

US 2016/0156078 A1 Jun. 2, 2016

Related U.S. Application Data

(62) Division of application No. 13/950,342, filed on Jul. 25, 2013, now Pat. No. 9,287,596.

(51) Int. Cl.
*H01M 10/625* (2014.01)
*H01M 10/6557* (2014.01)
*H01M 10/613* (2014.01)
*H01M 2/10* (2006.01)
*H01M 10/6561* (2014.01)

(52) U.S. Cl.
CPC ........ *H01M 10/6557* (2015.04); *H01M 2/1077* (2013.01); *H01M 10/613* (2015.04); *H01M 10/625* (2015.04); *H01M 10/6561* (2015.04); *H01M 2220/20* (2013.01)

(58) Field of Classification Search
CPC ............ H01M 10/625; H01M 10/647; H01M 10/6554; H01M 10/6556
See application file for complete search history.

(56) References Cited

U.S. PATENT DOCUMENTS

| 2009/0142650 | A1 | 6/2009 | Okada et al. | |
|---|---|---|---|---|
| 2010/0297486 | A1* | 11/2010 | Fujii | H01M 10/625 429/120 |
| 2011/0129716 | A1 | 6/2011 | Chung et al. | |
| 2011/0244293 | A1 | 10/2011 | Khalighi et al. | |
| 2012/0183822 | A1 | 7/2012 | Chung et al. | |
| 2013/0260197 | A1* | 10/2013 | Okada | H01M 2/1077 429/90 |

FOREIGN PATENT DOCUMENTS

JP 2008284947 A 11/2008

* cited by examiner

*Primary Examiner* — Brittany Raymond
(74) *Attorney, Agent, or Firm* — David B. Kelley; Brooks Kushman P.C.

(57) ABSTRACT

A high voltage battery module comprises a plurality of battery cells stacked in an array. The array is covered on its ends by a pair of opposing end plates, and is covered on its sides by a pair of opposing sidewalls. The sidewalls partially cover upper surfaces of the battery cells. Internal channels provide gaps between the sides of the battery cells and the interior surfaces of the sidewalls. An external channel is vertically spaced from the internal channel and is defined by the exterior surfaces of the sidewalls. Brackets secure the end plates to the sidewalls by at least partially extending into the external channels of the sidewalls.

8 Claims, 6 Drawing Sheets

AIR-COOLED BATTERY MODULE FOR A VEHICLE

CROSS-REFERENCE TO RELATED APPLICATIONS

This application is a division of U.S. application Ser. No. 13/950,342 filed Jul. 25, 2013, now U.S. Pat. No. 9,287,596, issued Mar. 15, 2016, the disclosure of which is hereby incorporated in its entirety by reference herein.

TECHNICAL FIELD

The present disclosure relates to an air-cooled high voltage traction battery module for a vehicle.

BACKGROUND

Hybrid electric vehicles (HEVs) include a high voltage traction battery for supplying power to an electric motor used to propel the vehicle. The traction battery may include several battery modules, each having an array of individual battery cells capable of delivering and storing electric energy to and from the electric motor. Use of the traction battery during travel may cause the temperature of individual battery cells within the battery modules to increase. Air-cooled and fluid-cooled systems have been developed to introduce relatively cool air or liquid into the traction battery while removing undesirable heat from within. This inhibits the battery from overheating, which would otherwise cause the battery to operate less efficiently.

SUMMARY

According to one embodiment, a high-voltage traction battery assembly for a hybrid electric vehicle is provided. An array of battery cells is stacked along a longitudinal axis. A first end plate and an opposing second end plate are spaced therefrom along the longitudinal axis. The end plates are secured to respective ends of the array. A first sidewall and an opposing second sidewall are spaced therefrom, and each sidewall is secured to both end plates extending generally perpendicular to the end plates. The battery module does not include an upper cover or a lower cover attached thereto. The first sidewall has a first ridge defining a first airflow passage between the array and the first ridge, and the second sidewall has a second ridge defining a second airflow passage between the array and the second ridge. The first end plate defines an inlet opening therethrough and aligned with the first airflow passage, and the second end plate defines an outlet opening therethrough and aligned with the second airflow passage. This enables air to flow through the inlet opening and the first airflow passage, across the array, and through the second airflow passage and outlet.

In another embodiment, a battery module is provided. A first and a second array of battery cells are arranged side-by-side. Each array has an upper surface and two longitudinal side surfaces defined by the collective surfaces of the battery cells within each array. A first pair of sidewalls covers the side surfaces of the first array. A second pair of sidewalls covers the side surfaces of the second array. Each sidewall has an interior channel extending along the length of the sidewall and spaced apart from the side surface that the sidewall covers. An airflow passage is therefore defined between the respective side surface and the interior channel. Two end plates are disposed at opposing ends of each array and secured to at least some of the sidewalls such that the battery module does not include an upper cover or a lower cover secured or otherwise attached thereto. Each end plate defines a pair of openings that align with at least some of the airflow passages. The airflow passages of the first and second side-by-side arrays define two exteriorly-disposed airflow passages and two interiorly-disposed airflow passages. The interiorly-disposed airflow passages define inflow passages and the exteriorly-disposed airflow passages define outflow passages. Caps cover openings in the end plates at one end of each of the airflow passages such that air flows into the inflow passages, across the battery cells, and out of the outflow passages during a battery cooling event. A double inlet plate has a pair of openings aligned with the interiorly-disposed openings and is mounted to both of the side-by-side arrays.

Another battery module is also provided according to the present disclosure. The battery module includes an array of battery cells, each cell having a top surface and opposing side surfaces. A pair of opposing sidewalls each has an interior channel spaced apart from respective side surfaces of the sidewall to define an airflow passage therebetween. The pair of opposing sidewalls each also has an exterior channel spaced from the interior channel. A pair of end plates are each mounted to the exterior channels of both of the sidewalls. A bracket mounts one of the end plates with one of the sidewalls. The bracket has a flange extending into the exterior channel of the one of the sidewalls. The attachment of the sidewalls and the end plates via the bracket enables the absence of covers attached to the battery module above and/or below the array of battery cells.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
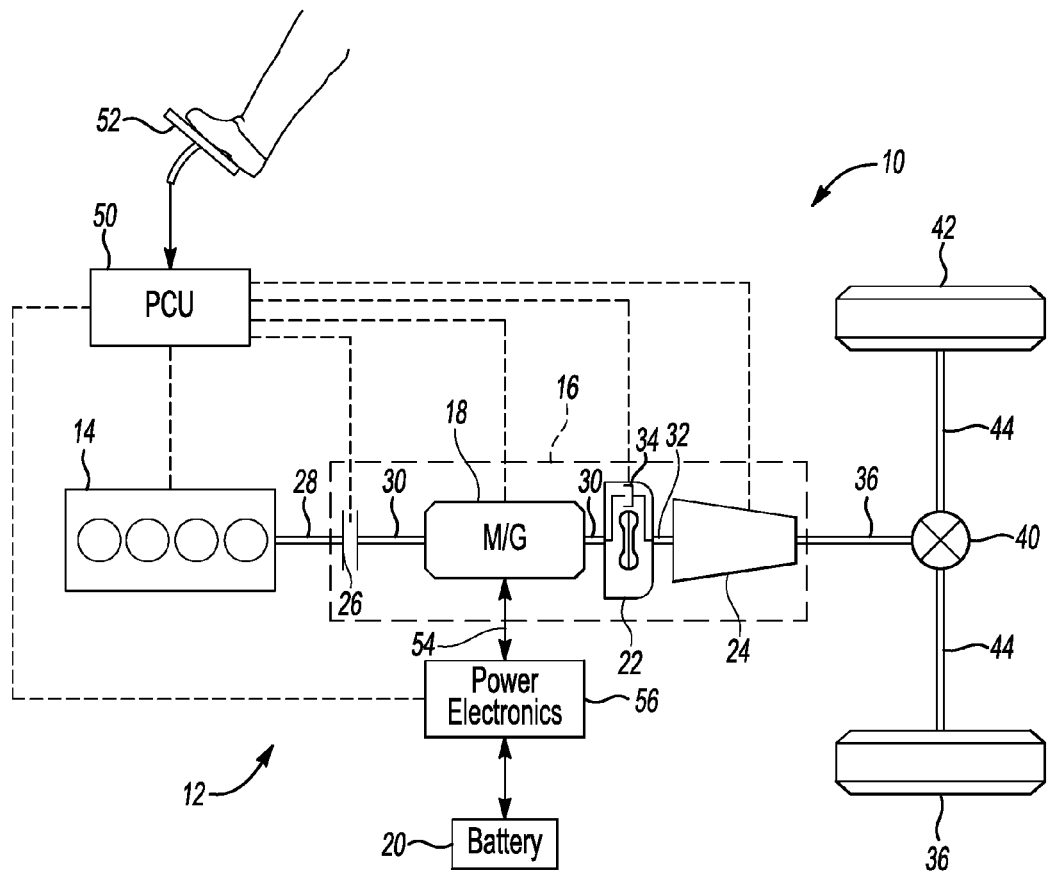
FIG. 1 is a schematic illustration of an exemplary powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
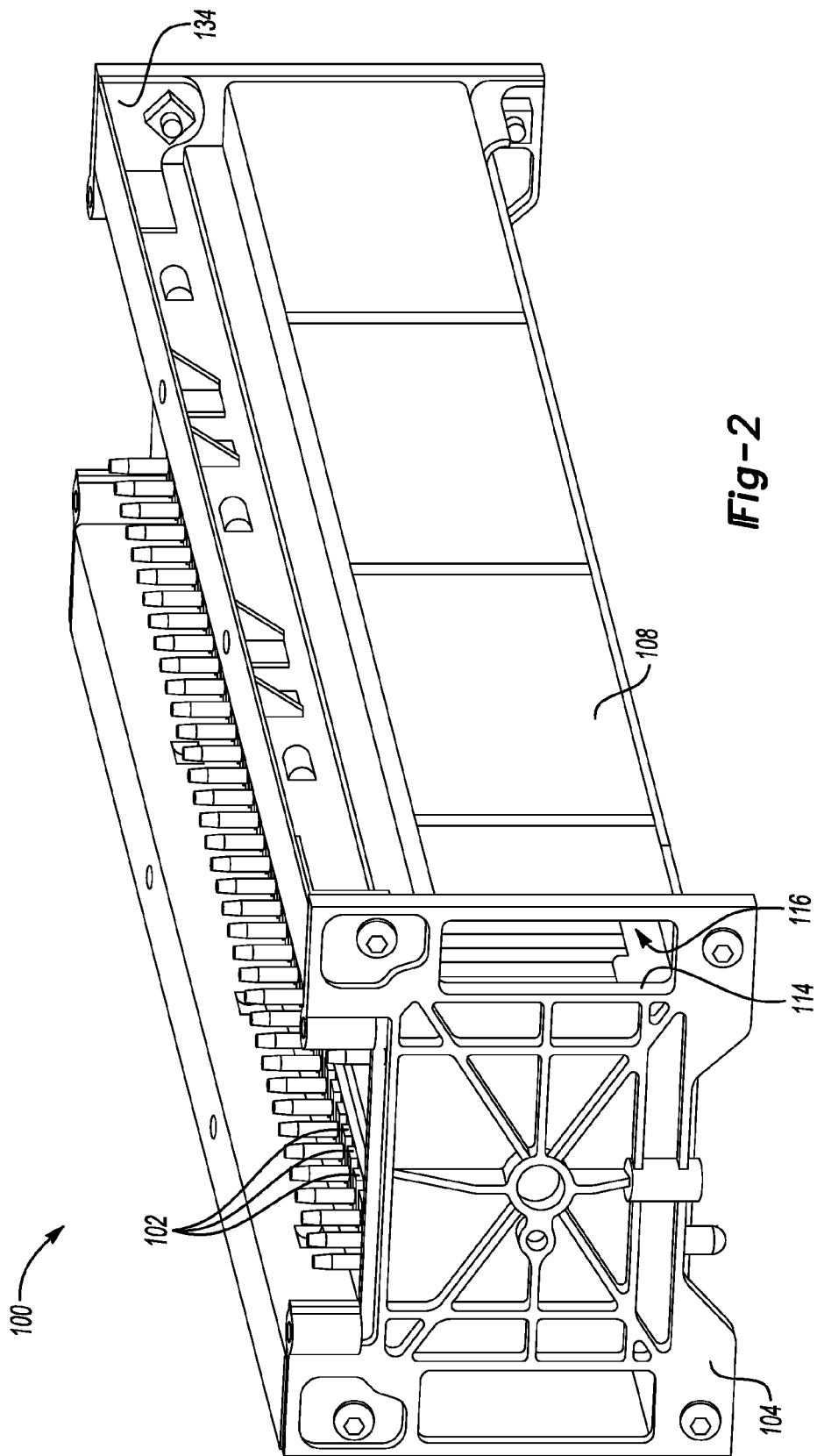
FIG. 2 is a perspective view of a battery module according to one embodiment.
Figure 3:
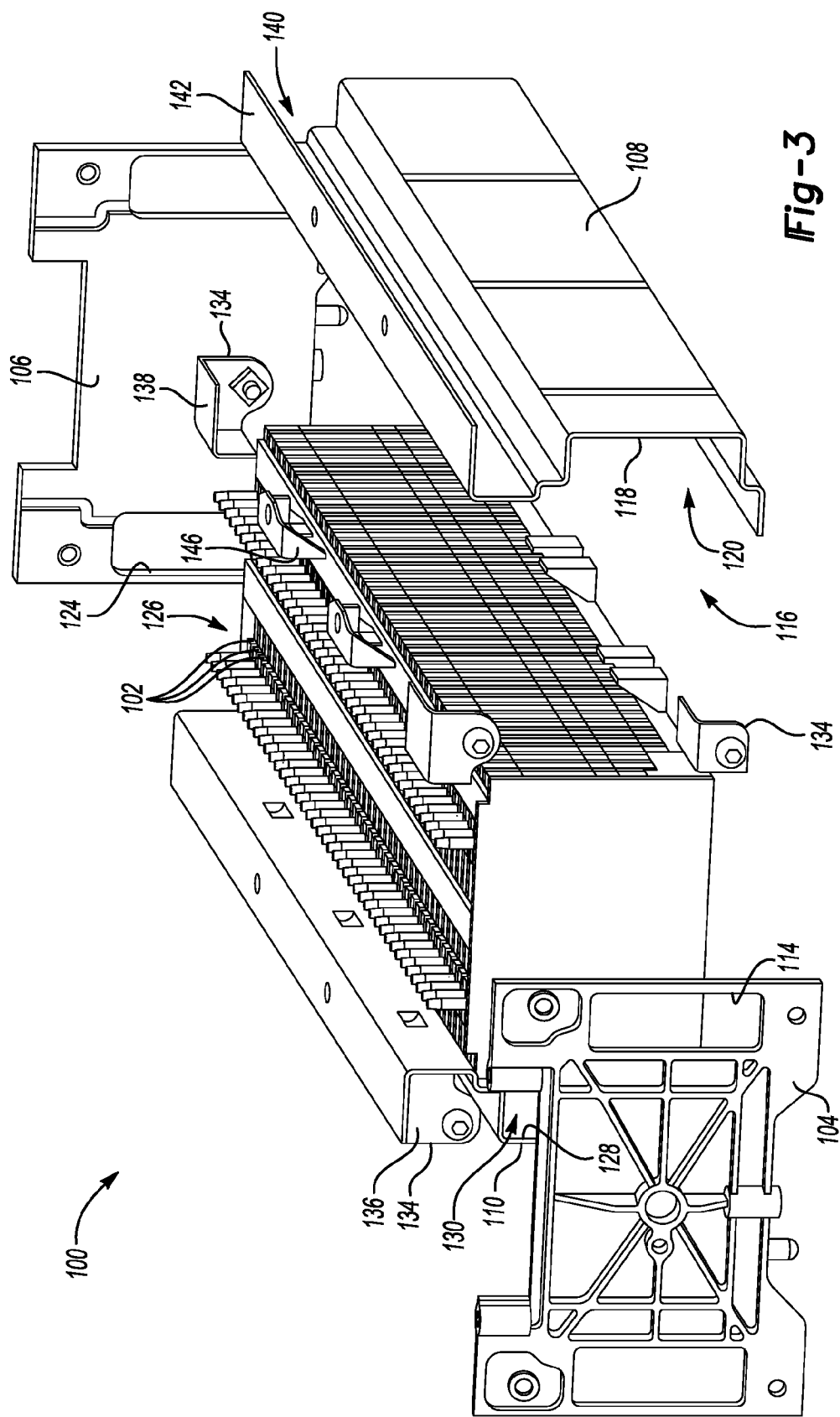
FIG. 3 is a partially-exploded perspective view of the battery module of FIG. 2.

Referring to FIGS. 2 and 3, a battery module 100 is illustrated. The battery module 100 may be one of many battery modules that collectively make up the battery 20. Each battery module 100 includes a stacked array of battery cells 102. The cells 102 are each capable of storing electric energy from and delivering electric energy to the power electronics 56 in the manner described above. As each cell 102 is capable of holding its own electric charge, a battery electronic control module (BECM) or other controller is responsible for the distribution of charge into, out of, and amongst the individual battery cells 102.

The cells 102 are stacked face-to-face along the length of the battery module 100. A small spacing or gap may exist between the faces of the cells 102 to allow for airflow across the faces of the cells 102.

First and second end plates 104, 106 are disposed at respective ends of the array of battery cells 102 to define the ends of the battery module 100. Each end plate 104, 106 can be identically manufactured and designed such that the same end plate can be assembled to the battery module 100 as either a first end plate 104 or a second end plate 106.

First and second sidewalls 108, 110 are mounted to both end plates 104, 106. The sidewalls 108, 110 have a length extending along a longitudinal axis of the module 100 to cover the side surfaces of the battery cells 102. Just as the end plates 104, 106 cover the ends of the battery module 100, the sidewalls encase the sides of the cells 102 within the module 100. When mounted together, the sidewalls 108, 110 and the end plates 104, 106 collectively define the boundaries of the battery module 100 and at least partially encapsulate the array of battery cells 102.

During extensive operation of the vehicle, the temperature in the battery 20 may rise. Temperature management is essential to insure optimum, safe, and efficient use of the battery 20. In order to maintain a desirable temperature in the battery 20, ambient fluid (such as air) should be introduced into the battery module 100. The description provided below relates to the packaging and structure of battery modules to facilitate optimum fluid flow within the battery module to maintain and control the battery temperature.

The first end plate 104 includes a pair of openings cut out of the plates for directing air through the battery module 100 to cool the battery cells 102. Of those two openings, one opening is an inlet opening 114 while the other opening may be capped or otherwise covered, as subsequently explained in further detail. The inlet opening 114 is aligned with a first airflow passage, or inflow passage 116. The inflow passage 116 is an open region within the battery module 100 between the side surfaces of the battery cells 102 and the interior surface of the first sidewall 108. The first sidewall 108 includes a longitudinal ledge or ridge 118 that forms an interior channel 120 within the first sidewall 108. The ridge 118 extends along the entire length of the interior surface of the first sidewall 108. The ridge 118 provides an air gap between the sides of the battery cells 102 and the first sidewall 108 to facilitate air circulation across the sides of the cells 102. During a cooling cycle, air flows from an external device (such as a fan) and into the inlet opening 114, whereupon the air is directed through the inflow passage 116 and interior channel 120, and toward the outlet opening discussed below.

The second end plate 106 includes a pair of openings similar to and aligned with the openings in the first end plate 104. Of these two openings, one opening is an outlet opening 124 while the other opening may be capped or otherwise covered, as subsequently explained in further detail. The outlet opening 124 is aligned with a second airflow passage, or outflow passage 126, that is located on the opposite side of the battery calls 102 from the inflow passage 116. Similar to the first sidewall 108, the second sidewall 110 includes a longitudinal ledge or ridge 128 that forms an interior channel 130 within the second sidewall. The ridge 128 extends along the entire length of the second sidewall 110 and provides an air gap between the sides of the battery cells 102 and the second sidewall 110. During a cooling cycle, after air is directed into the inflow passage 116 from the inlet opening, the air is able to pass between the battery cells 102 and into the interior channel 130 of the second sidewall 110. The air then exits through the outflow passage 126 and the outlet opening 124 of the second end plate 106. Additional detail regarding the airflow through the battery module 100 is provided with reference to FIG. 7 below.

The end plates 104, 106 and the sidewalls 108, 110 are secured together via brackets 134. The brackets 134 include a generally planar face 136 configured to rest on the backside of the corners of the end plates 104, 106. The brackets 134 also include a flange 138 extending transversely from the face 136 of the bracket 134. The flange 138 extends into an exterior channel 140 of the corresponding sidewall 108, 110 with which the bracket 134 mounts with.

Figure 4:
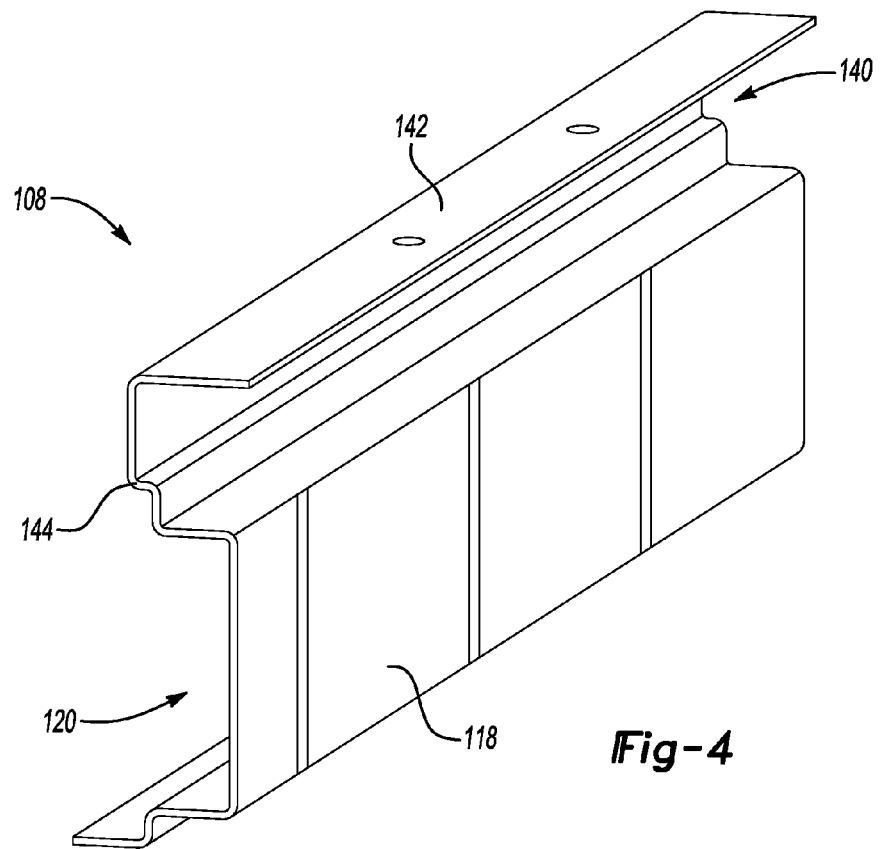
FIG. 4 is a perspective view of a sidewall of the battery module illustrating internal and external channels extending along the length of the sidewall.

As more clearly shown in FIG. 4, the exterior channel 140 is provided at an upper region of each of the sidewalls, such as first sidewall 108 shown. The exterior channel 140 is vertically spaced from the interior channel 120 and extends along the length of the sidewall 108. An upper shelf or flange 142 defines the top of the exterior channel 140. The exterior channel 140 serves as an attachment point for the flange 138 of the brackets 134 to secure the end plates 104, 106 to the sidewalls 108. For example, the 138 of the bracket mates with the top surface 142 of the exterior channel 140 for attachment.

When the sidewall 108 is mounted, a ledge 142 in the upper region of the sidewall 108 rests on a portion of the top surfaces of the battery cells 102. This ledge 142 enables the sidewall 108 to provide a secure upper perimeter about the battery cells 102 without the need for a separate upper plate to fully cover the upper sides of the battery cells 102. A similar ledge can be provided on the bottom of the sidewall 108 to at least partially cover a portion of the bottom surfaces of the battery cells. Additional brackets 146 can be placed throughout the exterior channel 140 to secure the sidewalls 108, 110 either directly or indirectly to the battery cells 102.

With the disclosure above, a unitary battery module 100 having a single array of battery cells 102 is therefore provided. The end plates 104, 106 contain the array of battery cells 102 from both longitudinal ends, while the sidewalls 108, 110 contain the array of battery cells 102 from the sides. The sidewalls 108, 110 also partially cover and secure the top surfaces of the battery cells 102 via ledge 144 without the need for a full cover above or below the top and bottom surfaces of the battery cells 102. The absence of a top or bottom cover reduces the amount of parts and the weight of the battery module 100 while maintaining a secure battery module shell formed by the secured end plates 104, 106 and the sidewalls 108, 110. The single-array, unitary battery module 100 can be easily transported, positioned, and assembled into vehicles along with other similar battery modules to make up the entire battery 20.

In order to cool the battery modules, a cooling cycle may include an activation of a fan by a controller. The controller may command the activation of the fan (and thus the cooling cycle) based on several factors such as battery cell temperature, discharge rate, and/or state of charge (SOC). During a cooling cycle, air is directed from the inflow passage 116, across the faces of the battery cells 102, and out through the outflow passage 126. The cooling cycle introduces ambient air into the battery module 100 and removes hot air from within to regulate and maintain the battery temperature. In order to force the air in this flow pattern, caps 150 are attached to the end plates 104, 106.

Figure 5:
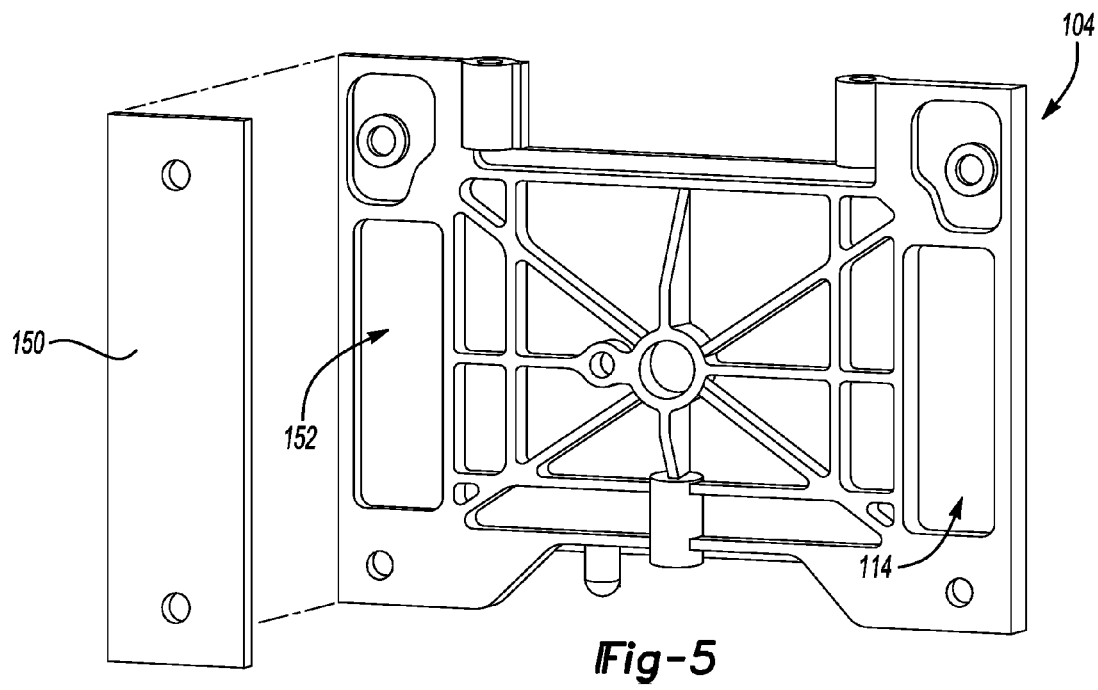
FIG. 5 is a perspective view of an end plate of the battery module with a cap covering one opening of the end plate.

FIG. 5 shows an isolated view of an end plate such as first end plate 104 with such a cap 150. The cap 150 is sized to cover the opening 152 in the end plate 104 that is not the inlet opening 114. Once secured (via screws, etc.) to the end plate 104 and over the opening 152, the cap 150 inhibits air from flowing out of the first end plate 104.

A similar cap is provided on the second end plate 106 to cover the opening in the end plate 106 that is not the outlet opening 124. This forces the air to exit through the outlet opening 124 of the second end plate 106 rather than the capped opening of the second end plate 106.

Figure 6:
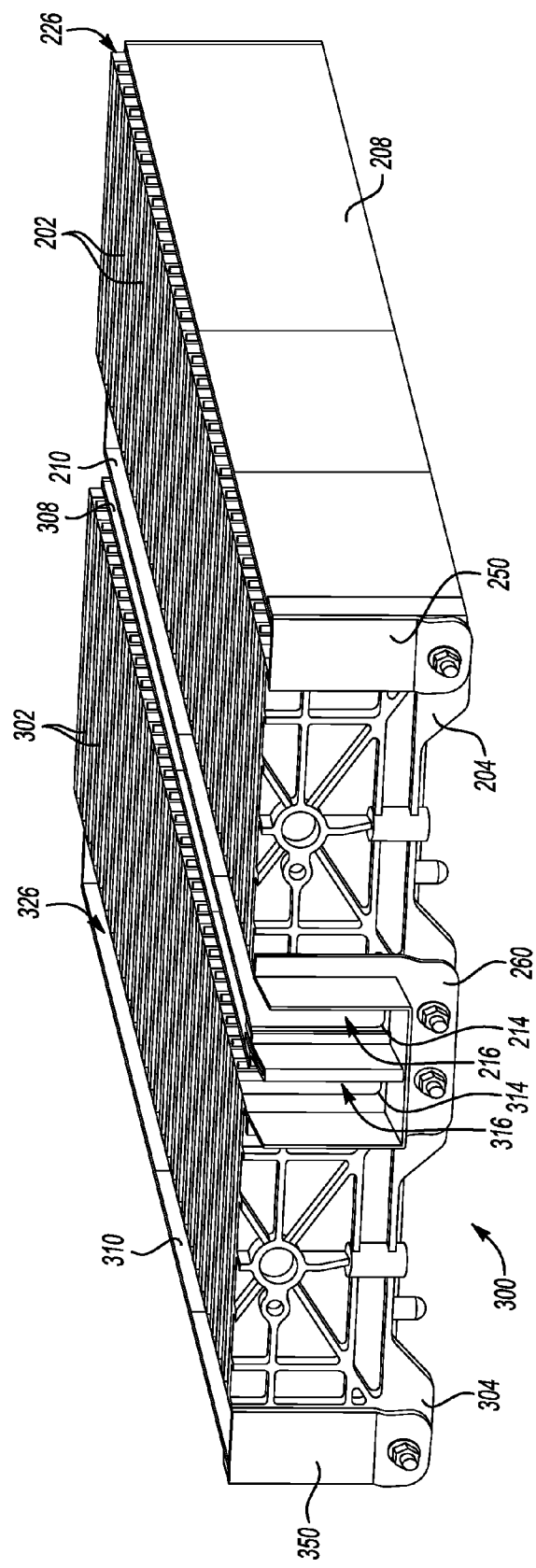
FIG. 6 is a cross-sectional perspective view of two side-by-side battery modules.
Figure 7:
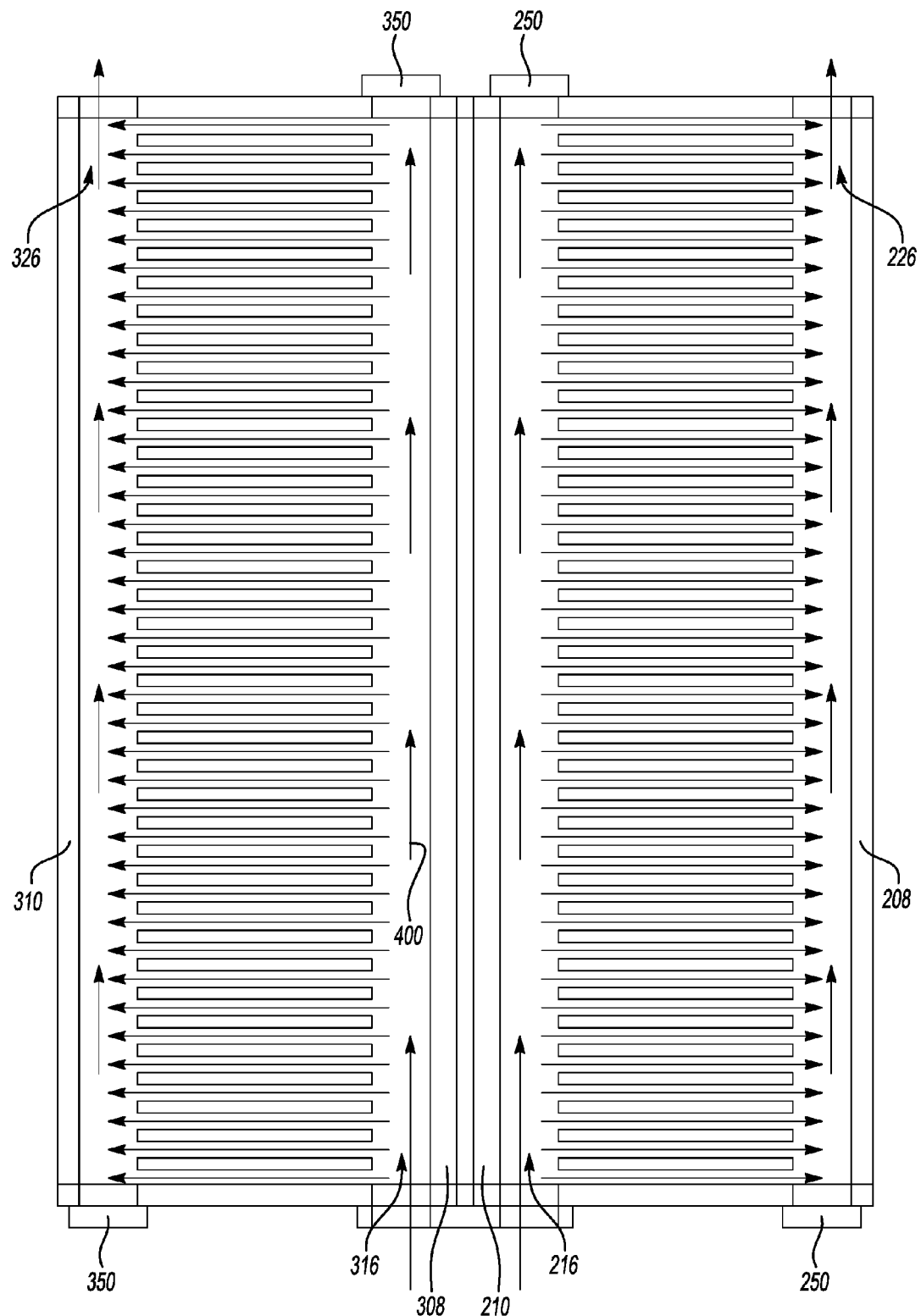
FIG. 7 is a cross-sectional top schematic view of the two side-by-side battery modules of FIG. 6.

FIGS. 6 and 7 both illustrate two separate battery modules connected together to form a high-voltage traction battery assembly. Each battery module includes the features as described with reference to FIGS. 1-5. For explanation purposes, the connected battery modules will be referred to as first battery module 200 and second battery module 300, each having parts and features similar to the battery module 100 described above with reference numbers increasing by 100 for each battery module 200, 300.

The first battery module 200 has an inflow passage 216 adjacent to an inflow channel 316 of the second battery module 300. The adjacent inflow passages 216, 316 begin at the respective inlet openings 214, 314 of the side-by-side end plates 204, 304. An inlet bracket or double-inlet plate 260 is mounted to both end plates 204, 304 and secures the two battery modules 200, 300 together. The bracket 260 may include protrusions or fins for connecting to an external machine (e.g., a fan, now shown). This allows one connection point for the two interior-most openings of the four openings formed in the side-by-side end plates 204, 304 of the separate battery modules 200, 300.

Caps 250, 350 are secured to the respective end plates 204, 304. The caps cover the exterior-most openings in the end plates 204, 304 that are not the inlet openings 214, 314. Additional caps are provided at the opposite ends of the battery modules 200, 300 to cover the interior-most openings formed in the end plates 206, 306. A first sidewall 208 of the first battery module 200 and a second sidewall 310 of the second battery module 300 are exteriorly-disposed relative to the pair of battery modules 200, 300. Similarly, a second sidewall 210 of the first battery module 200 and a first sidewall 308 of the second battery module 300 are interiorly-disposed within the pair of battery modules and define the boundaries of the respective inflow passages 216, 316.

During a cooling cycle, the caps force air to flow into the two adjacent inflow passages 216, 316, across the battery cells 202, 302 of each respective module 200, 300, and out of the exterior outflow passages 226, 326 on opposite sides of the side-by-side battery modules 200, 300. Arrows 400 indicate the airflow path throughout the battery modules 200, 300.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery module comprising:
    a first and a second array of battery cells, the arrays being arranged side-by-side and each having an upper surface and two longitudinal side surfaces;
    a first pair of sidewalls covering the side surfaces of the first array and a second pair of sidewalls covering the side surfaces of the second array, each sidewall having an interior channel extending along the length of the sidewall and spaced apart from its respective covered side surface to define an airflow passage between the respective side surface and the interior channel; and
    two end plates disposed at opposing ends of each array and secured to at least some of the sidewalls such that the battery module does not include an upper cover or a lower cover attached thereto, each end plate defining a pair of openings that align with at least some of the airflow passages.

2. The battery module of claim 1, wherein the airflow passages of the first and second side-by-side arrays define two exteriorly-disposed airflow passages and two interiorly-disposed airflow passages, and wherein the interiorly-disposed airflow passages define inflow passages and the exteriorly-disposed airflow passages define outflow passages such that air flows into the inflow passages, across the battery cells, and out of the outflow passages during a battery cooling event.

3. The battery module of claim 1, wherein the end plates of the first and second side-by-side arrays define two exteriorly-disposed openings and two interiorly-disposed adjacent openings, wherein the interiorly-disposed openings define inlet openings on one end of the arrays and the exteriorly-disposed openings define outlet openings on the other end of the arrays.

4. The battery module of claim 3 further comprising a double inlet plate having a pair of openings aligned with the interiorly-disposed openings, wherein the double inlet plate mounts to both of the side-by-side arrays.

5. The battery module of claim 1 further comprising a bracket mounting an upper region of one of the sidewalls to one of the end plates.

6. The battery module of claim 5, wherein the upper regions of each sidewall define an exterior channel extending along the length of the sidewall and wherein the bracket includes a flange at least partially extending into one of the passages.

7. A battery module comprising:
    first and second arrays of battery cells arranged side-by-side;
    two pairs of sidewalls, each pair covering side surfaces of each array, each sidewall having an interior channel spaced apart from its respective covered side surface to define respective airflow passages; and
    two end plates at opposing ends of each array and secured to at least some of the sidewalls such that the battery module does not include upper or lower covers.

8. A battery comprising:
first and second arrays of battery cells arranged side-by-side;
two pairs of sidewalls, each pair covering opposing side surfaces of one of the arrays, each sidewall defining an air-flow passage between that sidewall and its respective covered side surface, each sidewall defining a channel on an opposite side of the sidewall from the air-flow passage; and
a plurality of end plates each mounted to two sidewalls and covering one of the channels.

\* \* \* \* \*